(12) United States Patent
Shimizu et al.

(10) Patent No.: US 8,732,710 B2
(45) Date of Patent: May 20, 2014

(54) DEVICE AND METHOD FOR ORDERING PROCESS EXECUTION USING PROCESS STEP TABLES

(75) Inventors: Masahiro Shimizu, Tokyo (JP); Yasutoshi Matsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 1793 days.

(21) Appl. No.: 11/882,792

(22) Filed: Aug. 6, 2007

(65) Prior Publication Data

US 2008/0040719 A1 Feb. 14, 2008

(30) Foreign Application Priority Data

Aug. 9, 2006 (JP) ................................ 2006-216476

(51) Int. Cl.
*G06F 9/455* (2006.01)
*G06F 9/46* (2006.01)

(52) U.S. Cl.
USPC ........................................................ 718/102

(58) Field of Classification Search
None
See application file for complete search history.

(56) References Cited

U.S. PATENT DOCUMENTS

| 2004/0205690 A1* | 10/2004 | Pieper | 717/100 |
| 2006/0031817 A1* | 2/2006 | Pieper | 717/107 |
| 2008/0134073 A1* | 6/2008 | Bergantino et al. | 715/771 |

FOREIGN PATENT DOCUMENTS

| JP | 7-50019 | 2/1995 |
| JP | 10-134528 A | 5/1998 |
| JP | 10-149556 | 6/1998 |
| JP | 10-228644 | 8/1998 |
| JP | 2000-090438 | 3/2000 |
| JP | 2002-117632 A | 4/2002 |
| JP | 2004-062975 A | 2/2004 |
| JP | 2005-025927 A | 1/2005 |
| JP | 2006-4580 | 1/2006 |

OTHER PUBLICATIONS

Japanese Office Action issued Nov. 30, 2010 for corresponding Japanese Application No. 2006-216476.
Japanese Office Action issued Sep. 16, 2010 for corresponding Japanese Application No. 2006-216476.

* cited by examiner

*Primary Examiner* — Corey S Faherty
(74) *Attorney, Agent, or Firm* — Rader, Fishman & Grauer PLLC

(57) ABSTRACT

An electronic device that exercises control over processes arbitrary in number for execution using a control program, including: storage means for forming each of the processes for execution by the electronic device with any of various combinations of a plurality of unit processes, creating, for each of the processes, the control program for use by the electronic device to execute the processes by a unit program for execution of the unit processes and a process step table in which an execution sequence of the unit programs is defined, storing the process step table for each of the processes, and storing the unit programs listed in each of the process step tables; and execution means for executing, in the defined execution sequence, when any predetermined one of the processes is directed, the unit programs defined in any of the process step tables stored corresponding to the directed process.

11 Claims, 10 Drawing Sheets

FIG. 4

MANAGEMENT AREA (82)

DEFINITION TABLE

| PHYSICAL ADDRESS | OPERATION NUMBER | EXECUTION FUNCTION |
|---|---|---|
| 0x00000 | 1 | ADJUSTMENT 1 |
| 0x00004 | 2 | ADJUSTMENT 2 |
| 0x00008 | 3 | ADJUSTMENT 3 |

} ADJUSTMENT TABLE

DEFINITION TABLE

| PHYSICAL ADDRESS | OPERATION NUMBER | EXECUTION FUNCTION |
|---|---|---|
| 0x000C | 4 | MEASUREMENT 1 |
| 0x0010 | 5 | MEASUREMENT 2 |
| 0x0014 | 6 | MEASUREMENT 3 |

} MEASUREMENT TABLE

DEFINITION TABLE

| PHYSICAL ADDRESS | OPERATION NUMBER | EXECUTION FUNCTION |
|---|---|---|
| 0x0018 | 7 | SERVO OPERATION 1 |
| 0x001C | 8 | SERVO OPERATION 2 |
| 0x0020 | 9 | SERVO OPERATION 3 |

} SERVO OPERATION TABLE

DEFINITION TABLE

| PHYSICAL ADDRESS | OPERATION NUMBER | EXECUTION FUNCTION |
|---|---|---|
| 0x0024 | 10 | RETRY OPERATION 1 |
| 0x0028 | 11 | RETRY OPERATION 2 |
| 0x002C | 12 | RETRY OPERATION 3 |

} RETRY OPERATION TABLE

FIG. 5

PROCESS STEP TABLE

| PROCESS STEP NUMBER | OPERATION NUMBER | EXECUTION FUNCTION | RETRY NUMBER |
|---|---|---|---|
| 1 | 7 | SERVO OPERATION 1 | 12 |
| 2 | 1 | ADJUSTMENT 1 | 11 |
| 3 | 8 | SERVO OPERATION 2 | 12 |
| 4 | 2 | ADJUSTMENT 2 | 11 |
| 5 | 4 | MEASUREMENT 1 | 10 |
| 6 | 9 | SERVO OPERATION 3 | 12 |
| 7 | n | NULL | n |

PROCESS STEP TABLE

| PROCESS STEP NUMBER | OPERATION NUMBER | EXECUTION FUNCTION | RETRY NUMBER |
|---|---|---|---|
| 1 | 8 | SERVO OPERATION 2 | 12 |
| 2 | 6 | MEASUREMENT 3 | 10 |
| 3 | 7 | SERVO OPERATION 1 | 12 |
| 4 | 5 | MEASUREMENT 2 | 10 |
| 5 | 9 | SERVO OPERATION 3 | 12 |
| 6 | 6 | MEASUREMENT 3 | 10 |
| 7 | n | NULL | n |

MANAGEMENT AREA ~82

FIG. 6A

PROCESS STEP TABLE

| PROCESS STEP NUMBER | EXECUTION FUNCTION | RETRY NUMBER |
|---|---|---|
| 1 | SEEK OPERATION | 10 |
| 2 | RECORDING | 11 |
| 3 | SEEK OPERATION | 10 |
| 4 | JITTER MEASUREMENT | 10 |
| 5 | DIAGNOSIS | 12 |
| 6 | NULL | n |

FIG. 6B

PROCESS STEP TABLE

| PROCESS STEP NUMBER | EXECUTION FUNCTION | RETRY NUMBER |
|---|---|---|
| 1 | SEEK OPERATION | 10 |
| 2 | FOCUS BIAS SETTING | n |
| 3 | JITTER MEASUREMENT | 11 |
| 4 | FOCUS BIAS SETTING | n |
| 5 | JITTER MEASUREMENT | 11 |
| 6 | FOCUS BIAS SETTING | n |
| 7 | JITTER MEASUREMENT | 11 |
| 8 | FOCUS BIAS SETTING | n |
| 9 | JITTER MEASUREMENT | 11 |
| 10 | ADJUSTMENT VALUE DERIVATION | n |
| 11 | NULL | n |

DEVICE AND METHOD FOR ORDERING PROCESS EXECUTION USING PROCESS STEP TABLES

CROSS REFERENCES TO RELATED APPLICATIONS

The present invention contains subject matter related to Japanese Patent Application JP 2006-216476 filed in the Japanese Patent Office on Aug. 9, 2006, the entire contents of which being incorporated herein by reference.

BACKGROUND OF THE INVENTION

1. Field of the Invention

The present invention relates to an electronic device, a control method, and a control program and, more specifically, to an electronic device, a control method, and a control program that can prevent any possible deterioration of the recording/reproduction capability with more reliability.

2. Description of the Related Art

The recent recording/reproduction device rapidly becoming popular is a type capable of data recording and reproduction to/from a disk that is available with low manufacturing and material cost, e.g., CD-R (Compact Disk Recordable), CD-RW (Compact Disk Rewritable), MO (Magneto Optical Disk), MD (Mini Disc), DVD-R (Digital Versatile Disc Recordable), and DVD-RW.

Using these disks having good durability and portability as external recording media for disk recording/reproduction devices, for example, not only computers and VCRs (Videocassette Recorders) that have been popular, mobile devices such as digital still camera and disk camcorder are also getting popular.

For the aim of maintaining the level of recording/reproduction capability, some of such disk recording/reproduction devices are provided with a function of readjusting a parameter, which is used for operation control over the components thereof.

If with a disk camcorder, for the aim of preventing a user from missing his or her opportunity for imaging, the disk camcorder is required to have its unique product specifications, i.e., the shorter disk recognition time, and the stable recording/reproduction operation in the outside use even with vibrations and bumps.

To meet such a demand, in addition to adjustment before shipment, some disk camcorder is provided with a function of readjusting, also after shipment, a parameter for operation control over the components to deal with the characteristics of disks varying in type, e.g., skew, deflection, and surface runout. The disks are those provided by vendors, i.e., manufacturers. Through parameter readjustment as such, the disk recognition time can be shortened, and the recording/reproduction capability can be maintained.

The issue here is that, such a disk recording/reproduction device does not always perform parameter readjustment to every item needed to be adjusted for maintaining the recording/reproduction capability. With this being the case, for some of the parameters, adjustment values before shipment are to be used as fixed values. Such fixed values considered optimum for the parameters often change from the values being the adjustment result at the time of manufacturing due to assembly variations and aging of the components. This value change has been a cause for deterioration of the recording/reproduction capability.

In consideration thereof, some disk recording/reproduction device is so configured as to detect something unusual for the components thereof such as aging or failure, and through detection as such, the disk recording/reproduction device encourages a user to make repairs, perform maintenance, or exchange the components.

As an example, Patent Document 1 (JP-A-2000-90438) describes such a disk recording/reproduction device in which a laser current detection circuit is provided for detecting a current flow in a laser diode, and based on the detection result, i.e., current, any unusual problem or failure is detected for the laser diode. Patent Document 2 (JP-A-10-149556) also describes, as another example, such a disk recording/reproduction device that stores the number of defective sectors found during data recording to a disk, and when the number becomes a predetermined number of larger, encourages a user to clean an optical head.

Some disk recording/reproduction device readjusts, based on the user's history of use, several of parameters that have been so far fixed in value. As another example, Patent Document 3 (JP-A-7-50019) describes such a disk recording/reproduction device that detects the temperature therein, and when the detected temperature exceeds a predetermined temperature, performs offset readjustment for a tracking error signal or a focus error signal. Patent Document 4 (JP-A-10-228644) also describes, as another example, such a disk recording/reproduction device that readjusts, to deal with any possible deterioration of components configuring a laser diode, the intensity of laser output from the laser diode at preset time intervals.

Moreover, Patent Document 5 (JP-A-2006-4580) describes another disk recording/reproduction device that performs self-diagnosis for its recording/reproduction capability in response to a user command, and based on the diagnosis result, performs parameter readjustment. With this disk recording/reproduction device, the intensity of the laser output from a laser diode is adjusted again whenever a user command comes even after the product shipment, thereby preventing any possible deterioration of the recording/reproduction capability.

SUMMARY OF THE INVENTION

The issue here is that, if some error occurs when a disk recording/reproduction device is in operation, there are various possible causes for the error. To prevent occurrence of such an error, and to maintain the recording/reproduction capability of the disk recording/reproduction device, there thus needs to perform diagnosis and readjustment to many items. This means that a program for the diagnosis and readjustment is required as many as the items.

Another issue is that disks are recently varying widely, and if any setting change is required depending on the disk type during component operation, the data amount of a program for diagnosis and readjustment thus shows a conspicuous increase because every disk type has its own parameter value.

In a disk recording/reproduction device, a program for such diagnosis and readjustment is required to be stored in advance in a ROM (Read Only Memory) or temporarily in an RAM (Random Access Memory) at the time of program execution. Accordingly, when the ROM or RAM provided to the disk recording/reproduction device does not have enough capacity for storage of the program, the disk recording/reproduction device cannot perform the diagnosis and readjustment for sufficient number of items, thereby resulting in a difficulty in maintaining the recording/reproduction capability.

In the disk recording/reproduction device, a host computer may store therein a program for executing diagnosis and readjustment as an application program, and by running the application program, control may be exercised, in terms of diagnosis and readjustment, over the disk recording/reproduction device connected to the host computer. If this is the case, however, it is necessary to implement an algorithm for such diagnosis and readjustment and much of the processing on the end of the host computer.

As such, the host computer is required to exercise control over the processes of diagnosis and readjustment while carrying out communications with the disk recording/reproduction device. This resultantly causes the increase of communications overhead due to the communications format used in compliance with an ATAPI (AT Attachment Packet Interface) packet command, thereby also increasing the processing time. Another problem is that a user has to purchase such a host computer only to maintain the recording/reproduction capability of the disk recording/reproduction device, and this is not practical at all.

It is thus desirable to prevent any possible deterioration of the recording/reproduction capability with more ease and reliability at lower cost.

According to an embodiment of the present invention, there is provided an electronic device that exercises control over processes arbitrary in number for execution using a control program. The electronic device includes: storage means for forming each of the processes for execution by the electronic device with any of various combinations of a plurality of unit processes, creating, for each of the processes, the control program for use by the electronic device to execute the processes by a unit program for execution of the unit processes and a process step table in which an execution sequence of the unit programs is defined, storing the process step table for each of the processes, and storing the unit programs listed in each of the process step tables; and execution means for executing, in the defined execution sequence, when any predetermined one of the processes is directed, the unit programs defined in any of the process step tables stored corresponding to the directed process.

In the embodiment of the invention, the processes include a process of diagnosis of diagnosing whether the execution means is operating normally, or a process of readjustment of appropriately readjusting a parameter value for use when the processes are executed.

In the embodiment of the invention, the processes include a process related to data reading from a disk or data recording to the disk.

In the embodiment of the invention, the process step table carries therein information about, when any error is occurred during the execution of any of the unit programs that is firstly executed, any of the unit programs that is secondly executed for resetting the execution sequence to the firstly-executed unit program, and when any error is occurred during the execution of the firstly-executed unit program, the execution means executes the secondly-executed unit program by referring to the process step table.

According to another embodiment of the present invention, there is provided a control method or a control program of exercising control over processes arbitrary in number for execution by an electronic device using a control program. The control method or the control program includes the steps of: forming, when a process command is provided for execution of any of the processes, each of the processes for execution by the electronic device with any of various combinations of a plurality of unit processes, creating, for each of the processes, the control program for use by the electronic device to execute the processes by a unit program for execution of the unit processes and a process step table in which an execution sequence of the unit programs is defined, and reading the process step table corresponding to the directed process and the unit program defined therein; and executing the read unit program in the execution sequence defined in the read process step table.

In the embodiment of the invention, in an electronic device of exercising control over processes arbitrary in number for execution using a control program, when a process command is provided for execution of any of the processes, each of the processes for execution by the electronic device is formed with any of various combinations of a plurality of unit processes, and for each of the processes, the control program is created for use by the electronic device to execute the processes by a unit program for execution of the unit processes and a process step table in which an execution sequence of the unit programs is defined. The process step table corresponding to the directed process and the unit program defined therein are read, and the read unit program is executed in the execution sequence defined in the read process step table.

According to one embodiment of the invention, processes can be executed and, specifically, according to one embodiment of the invention, the recording/reproduction capability can be prevented from any possible deterioration with more ease and reliability at lower cost.

BRIEF DESCRIPTION OF THE DRAWINGS

FIG. 4 is a diagram for illustrating a definition table;

FIG. 5 is a diagram for illustrating a process step table;

FIGS. 6A and 6B are each a diagram showing another exemplary process step table;

DETAILED DESCRIPTION OF THE INVENTION

Prior to describing an embodiment of the invention below, exemplified is a correlation among claimed components and an embodiment in this specification or in the accompanying drawings. This is aimed to prove that an embodiment provided for the purpose of supporting the description of claims is described in the specification or in the accompanying drawings. Therefore, even if there is any specific embodiment found in the specification or in the accompanying drawings but not found here for the components described in the embodiment of the invention, it does not mean that the embodiment is not correlated with the components. On the other hand, even if there is any specific embodiment found here for the components, it does not mean that the embodiment is only correlated with the components.

One embodiment of the invention is directed to an electronic device (e.g., a disk recording/reproduction device 1 of FIG. 1) that exercises control over processes arbitrary in number for execution using a control program. The electronic device includes: storage means (e.g., a drive memory 47 of FIG. 2) for forming each of the processes for execution by the electronic device with any of various combinations of a plurality of unit processes, creating, for each of the processes, the control program for use by the electronic device to execute the processes by a unit program for execution of the unit processes and a process step table (e.g., a process step table of FIG. 5) in which an execution sequence of the unit programs is defined, storing the process step table for each of the processes, and storing the unit programs listed in each of the process step tables; and execution means (e.g., a firmware control section 46 of FIG. 2) for executing, in the defined execution sequence, when any predetermined one of the processes is directed, the unit programs defined in any of the process step tables stored corresponding to the directed process.

Figure 9:
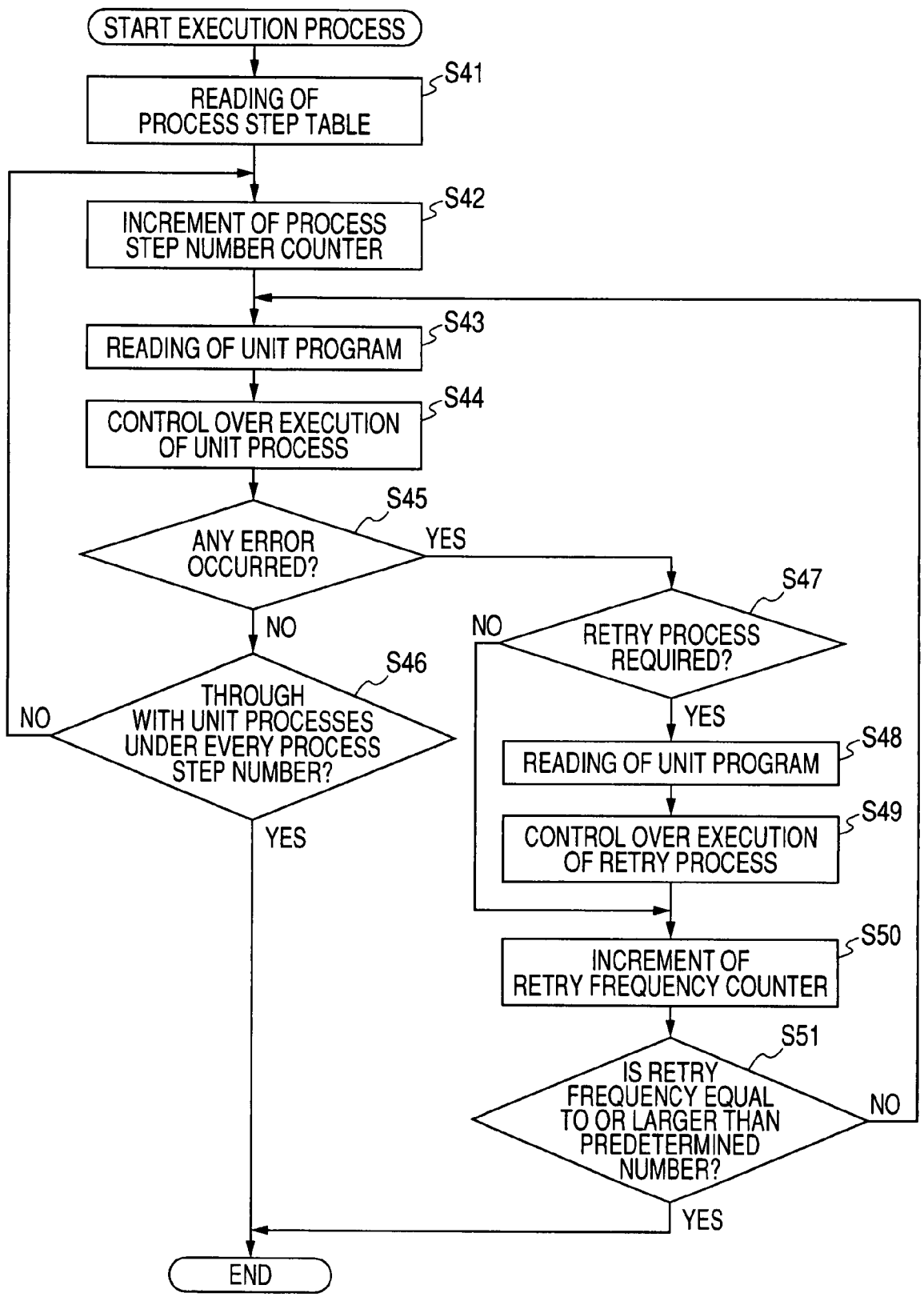
FIG. 9 is a flowchart for illustrating an execution process.

The process step table carries therein information (e.g., a retry number of FIG. 5) about, when any error is occurred during the execution of any of the unit programs that is firstly executed, any of the unit programs that is secondly executed for resetting the execution sequence to the firstly-executed unit program, and when any error is occurred during the execution of the firstly-executed unit program, the execution means executes the secondly-executed unit program by referring to the process step table (e.g., a process of step S49 of FIG. 9).

One embodiment of the invention is directed to a control method or a control program of exercising control over processes arbitrary in number for execution by an electronic device using a control program. The control method or the control program includes the steps of: forming, when a process command is provided for execution of any of the processes, each of the processes for execution by the electronic device with any of various combinations of a plurality of unit processes, creating, for each of the processes, the control program for use by the electronic device to execute the processes by a unit program for execution of the unit processes and a process step table in which an execution sequence of the unit programs is defined, and reading the process step table corresponding to the directed process and the unit program defined therein (e.g., steps S41 and S43 of FIG. 9); and executing the read unit program in the execution sequence defined in the read process step table (e.g., step S44 of FIG. 9).

The invention is applicable not only to an information processing device using a recording medium typified by a disk, e.g., disk camcorder, digital still camera, personal computer, portable DVD player, and DVD recorder, but also to various types of electronic devices whose functions are under the control of a program.

In the below, described is an embodiment of the invention by referring to the accompanying drawings.

Figure 1:
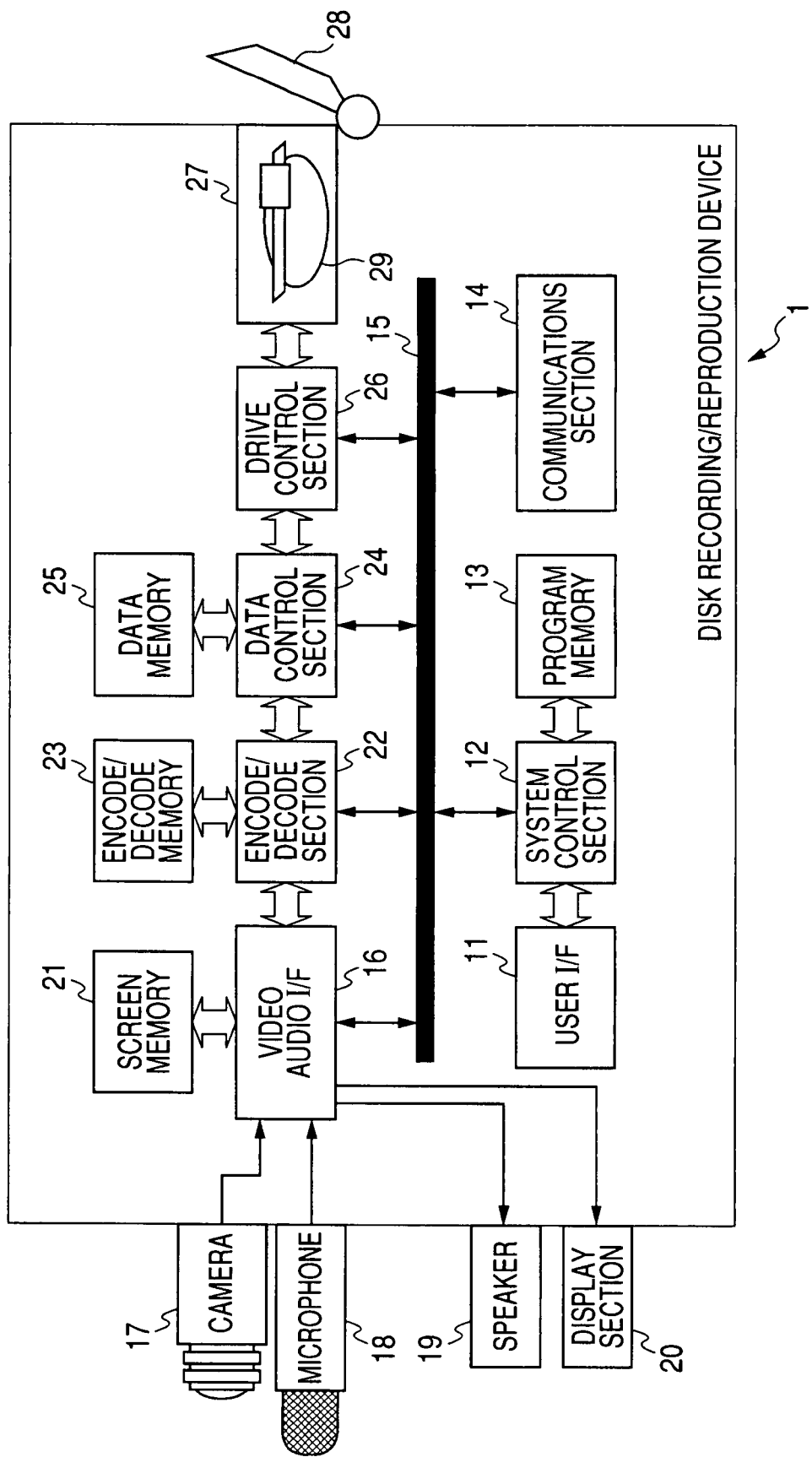
FIG. 1 is a block diagram showing the configuration of a disk recording/reproduction device of an embodiment of the invention.

FIG. 1 is a block diagram showing an exemplary configuration of a disk recording/reproduction device to which the invention is applied.

A disk recording/reproduction device 1 is configured to include a user I/F (Interface) 11, a system control section 12, a program memory 13, a communications section 14, a video audio I/F 16, a camera 17, a microphone 18, a speaker 19, a display section 20, a screen memory 21, an encode/decode section 22, an encode/decode memory 23, a data control section 24, a data memory 25, a drive control section 26, a drive 27, and a lid 28.

The user I/F 11 accepts user operation of an operation section configured by an operation key, an input button, a switch, and the like, that are not shown. In accordance with the user operation, the user I/F 11 supplies an operation signal to the system control section 12. The user I/F 11 is under the control of the system control section 12, and exercises control over light-emitting elements and audio elements (not shown) so that light and audio are generated for use to notify the user of the state of the disk recording/reproduction device 1.

The system control section 12 is connected to the program memory 13, and runs a program stored in the program memory 13, thereby exercising control over the components. The system control section 12 is also connected to, via a bus 15, the video audio I/F 16, the encode/decode section 22, the data control section 24, the drive control section 26, and the communications section 14.

The system control section 12 supplies a command and various types of data to the drive 27 via the bus 15, the data control section 24, and the drive control section 26. The command here is the one directing the drive 27 to execute any predetermined process, and the various types of data are those provided by the communications section 14 over the bus 15.

The program memory 13 stores therein various types of programs, and data needed for execution of processes varying in type. The program memory 13 stores therein a file system, for example. The communications section 14 communicates with any external device connected to the disk recording/reproduction device 1, and supplies various types of data provided by the external device to the system control section 12 over the bus 15.

The video audio I/F 16 acquires image data provided by the camera 17, and audio data provided by the microphone 18, and forwards the image and audio data to the encode/decode section 22. The video audio I/F 16 forwards the audio data from the microphone 18 or the encode/decode section 22 to the speaker 19, and forwards the image data from the camera 17 or the encode/decode section 22 to the display section 20.

The video audio I/F 16 reads data from the screen memory 21, and performs any predetermined computation based on the data. The data stored in the screen memory 21 is the one for displaying characters and graphic symbols such as icons. The video audio I/F 16 forwards the computation result, i.e., image data of characters and graphic symbols such as icons, to the display section 20.

The camera 17 captures an image of an object, i.e., moving images or a still image, and subjects an A/D (Analog/Digital) conversion to an analog image signal of the captured image (s). The camera 17 supplies image data, i.e., digital data as a result of A/D conversion, to the video audio I/F 16.

The microphone 18 acquires audio around the disk recording/reproduction device 1 at the time of imaging by the camera 17, and supplies audio data, i.e., digital data of the acquired audio, to the video audio I/F 16.

The speaker 19 generates audio corresponding to the audio data from the video audio I/F 16. The display section 20 is configured by an LCD (Liquid Crystal Display), an EVF (Electronic View Finder), or the like, and displays thereon an image corresponding to the image data from the video audio I/F 16.

The screen memory 21 stores therein data for display of characters and graphic symbols such as icons. Note here that the disk recording/reproduction device 1 may not be provided with such a screen memory 21.

The encode/decode section 22 stores the image and audio data coming from the video audio I/F 16 into the encode/decode memory 23, and at the same time, encodes the data with MPEG-1 (Moving Picture Experts Group phase 1), MPEG-2, MPEG-4, JPEG (Joint Photographic Experts Group), and the like. The resulting image data and audio data being the encoding results are forwarded to the data control section 24. The encode/decode section 22 also decodes the image and audio data from the data control section 24, and forwards the resulting image and audio data to the video audio I/F 16.

The encode/decode memory 23 stores therein a difference of image data between frames or fields, for example.

The data control section 24 manages the data stored in the data memory 25 with FIFO (First In First Out). Specifically, the data control section 24 supplies the image and audio data from the encode/decode section 22 or the drive control section 26 to the data memory 25 for storage therein. The data control section 24 also reads the earliest image and audio data from the data memory 25 for supply to the encode/decode section 22 or the drive control section 26.

The data control section 24 temporarily stores, into the data memory 25 if required, a command or various types of data from the system control section 12 for supply to the drive control section 26. The data memory 25 temporarily stores therein the image and audio data, and the command and the various types of data all provided by the data control section 24.

The drive control section 26 performs handshaking not sequentially with the drive 27 in compliance with the ATA (AT Attachment)/ATAPI standard, thereby forwarding the image and audio data from the data control section 24 to the drive 27 or receiving the image and audio data reproduced from a disk 29 attached to the drive 27. The drive control section 26 also supplies the image and audio data provided by the drive 27 to the data control section 24. The drive control section 26 also forwards various types of commands and data to the drive 27 under the control of the system control section 12.

In the below, presumably, the drive control section 26 and the drive 27 perform communications in compliance with the ATA/ATAPI standard. Alternatively, the communications may be carried out in compliance with the SCSI (Small Computer System Interface), USB (Universal Serial Bus), IEEE (Institute of Electrical and Electronics Engineers) 1394, and the like.

The drive 27 is attached with the disk 29 exemplified by a CD-R, CD-RW, MO, MD, DVD-R, DVD-RW, and others. Specifically, a user opens the lid 28, and inserts the disk 29 into the disk 27 so that the disk 29 is attached to the drive 27. To remove the disk 29 from the drive 27, the user opens the lid 28, and the disk 29 is ejected from the drive 27.

Figure 2:
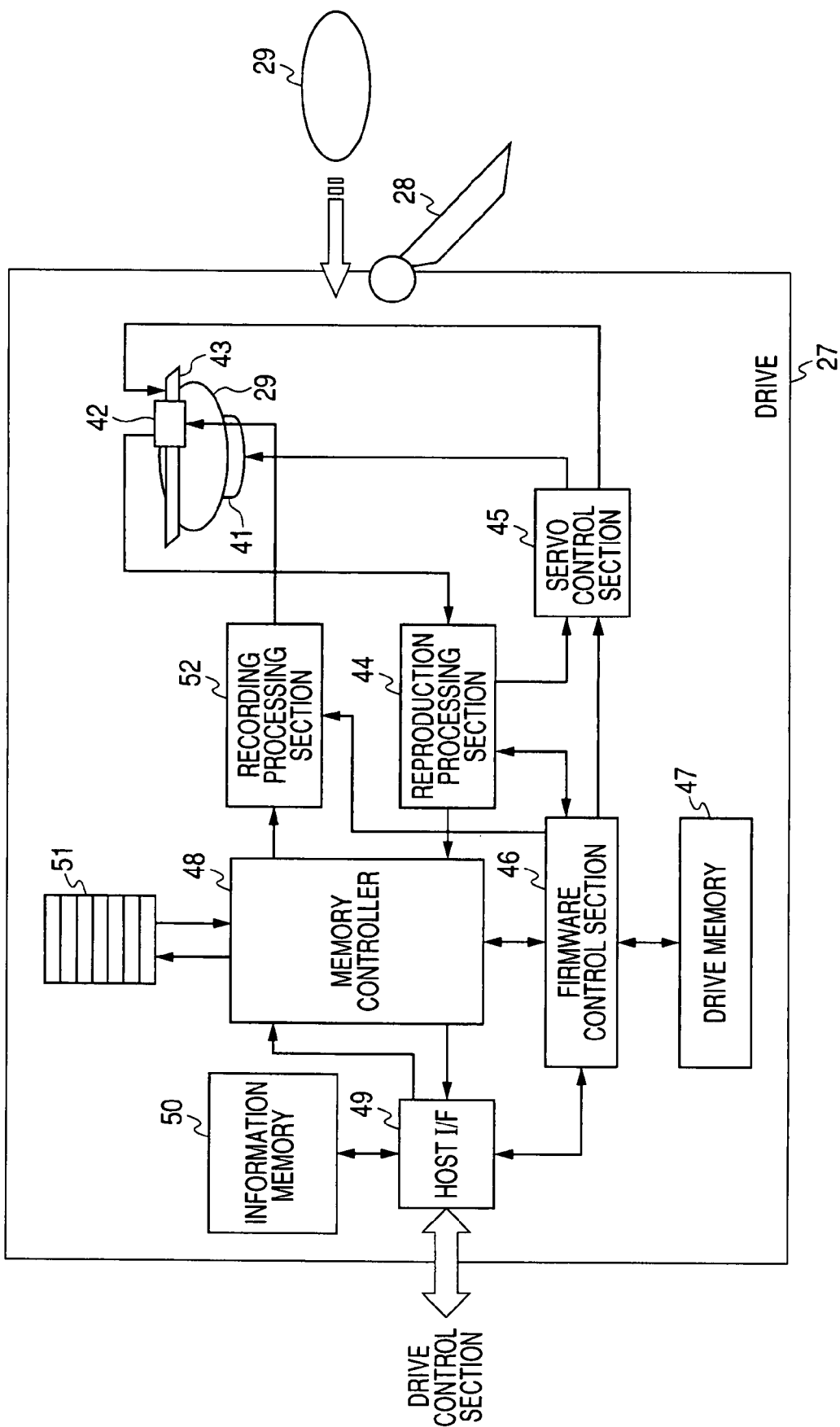
FIG. 2 is a block diagram showing the more detailed configuration of a drive.

FIG. 2 shows the more detailed exemplary configuration of the drive 27 of FIG. 1.

The drive 27 is configured to include a spindle motor 41, an optical pickup 42, a thread 43, a reproduction processing section 44, a servo control section 45, a firmware control section 46, a drive memory 47, a memory controller 48, a host I/F 49, an information memory 50, a cache memory 51, and a recording processing section 52.

The drive 27 serves to record the image and audio data provided by the drive control section 26 to the disk 29, and supplies the image and audio data reproduced from the disk 29 to the drive control section 26.

A user opens the lid 28, and inserts the disk 29 into the drive 27 so that the disk 29 is attached to the disk 27. To be specific, the disk 29 is coupled to a shaft of the spindle motor 41 by a clamp mechanism that is not shown. The spindle motor 41 rotates and drives the disk 29.

At the position of the disk 29 opposing the data recording surface, the optical pickup 42 is disposed. The optical pickup 42 is placed on the thread 43 connected to a motor via a driving force transmission member such as gear, and moves in the diameter direction of the disk 29. The optical pickup 42 exercises control over a laser output based on the recording data coming from the recording processing section 52, and records the recording data to the disk 29.

The optical pickup 42 collects laser light, and irradiates the laser light to the disk 29. The irradiated laser light is reflected on the disk 29, and the optical pickup 42 receives the reflected light so that the data recorded on the disk 29 is read out from the data recording surface thereof. The optical pickup 42 converts thus received reflected light into an electric signal indicating the intensity of the received light, and supplies the resulting electric signal to the reproduction processing section 44.

Based on the control exercised by the firmware control section 46, the reproduction processing section 44 applies RF (Radio Frequency) signal processing to the electric signal provided by the optical pickup 42. The RF processing is of acquiring an RF signal. The reproduction processing section 44 also supplies a servo signal derived from the RF signal to the servo control section 45.

The reproduction processing section 44 subjects a reproduction signal derived from the RF signal to binarization. The reproduction processing section 44 is provided therein with a PLL (Phase Locked Loop) circuit (not shown), which generates a clock synchronous with the reproduction signal being the result of binarization, i.e., reproduction data. In synchronization with the clock, the reproduction processing section 44 applies EFM (Eight to Fourteen Modulation) demodulation to the reproduction data, and supplies the EFM-demodulated reproduction data to the memory controller 48.

Under the control of the firmware control section 46, the servo control section 45 drives the spindle motor 41 and the motor of the thread 43 based on the servo signal coming from the reproduction processing section 44 so that the optical pickup 42 is controlled thereby in terms of focusing and tracking.

The firmware control section 46 is exemplified by a microcomputer or others, and runs firmware so as to exercise control over the components in accordance with a command coming from the host I/F 49. The firmware is a program stored in the drive memory 47 for use for recording and reproduction of the disk 29, adjustment of any predetermined parameters, operation diagnosis of the drive 27, and the like. For example, the firmware control section 46 supplies data from the drive control section 26 to the drive memory 47 for storage therein. The firmware control section 46 also exercises control over the components, i.e., the reproduction processing section 44, the servo control section 45, and the recording processing section 52, based on information about the parameters stored in the drive memory 47.

The drive memory 47 is configured by a nonvolatile memory such as flash memory, for example, and stores therein firmware and information about parameters.

Under the control of the firmware control section 46, the memory controller 48 stores the reproduction data coming from the reproduction processing section 44 into the cache memory 51, and reads the reproduction data stored in the cache memory 51. The memory controller 48 supplies the reproduction data read as such to the host I/F 49.

Under the control of the firmware control section 46, the memory controller 48 stores, in the cache memory 51, the image and audio data from the host I/F 49 as recording data. The memory controller 48 also reads the recording data stored in the cache memory 51, and supplies the data to the recording processing section 52.

Under the control of the firmware control section 46, the host I/F 49 forwards the reproduction data provided by the memory controller 48 to the drive control section 26 in compliance with the ATA/ATAPI standard, for example.

Alternatively, the memory controller 48 may supply the reproduction data to the firmware control section 46, and the firmware control section 46 may apply predetermined processing to the reproduction data provided by the memory controller 48, and forward the resulting reproduction data to the drive control section 26 via the host I/F 49. If this is the case, the firmware control section 46 may apply no processing to the reproduction data provided by the memory controller 48 before transmission to the drive control section 26 via the host I/F 49.

Under the control of the firmware control section 46, the host I/F 49 acquires the image and audio data or a command from the drive control section 26. The host I/F 49 supplies the image and audio data to the memory controller 48. The host I/F 49 also forwards the acquired command to the information memory 50 for storage therein, or reads any command stored in the information memory 50 for supply to the firmware control section 46.

The information memory 50 is exemplified by an SDRAM (Synchronous Dynamic Random Access Memory), and stores therein a command coming from the host I/F 49, e.g., ATA/ATAPI-packetized command data. Under the control of the firmware control section 46, the recording processing section 52 modulates the recording data from the memory controller 48 for supply to the optical pickup 42.

Figure 3:
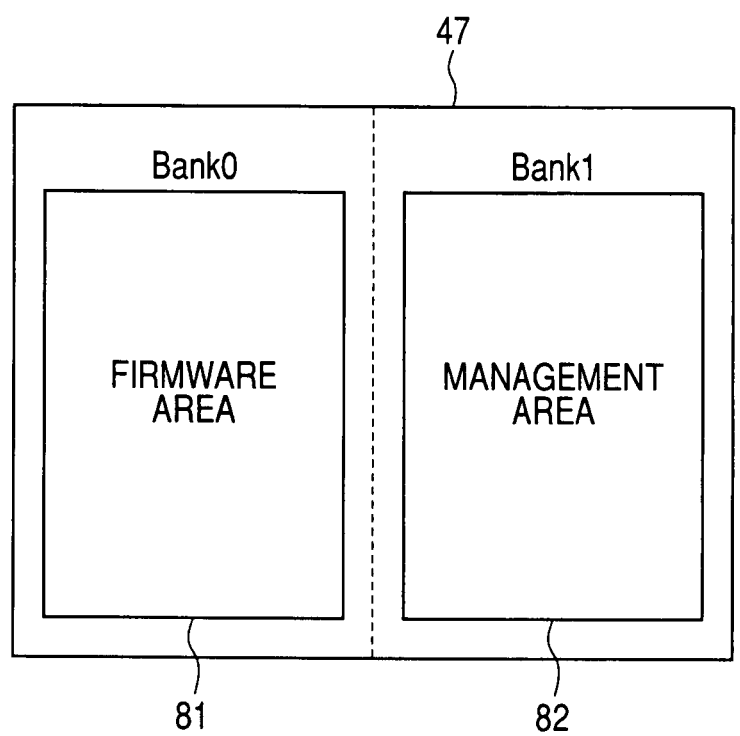
FIG. 3 is a diagram showing the configuration of a drive memory.

As shown in FIG. 3, the drive memory 47 is configured to include a firmware area 81 and a management area 82 in accordance with the bank structure. The firmware area 81 stores therein firmware, and the management area 82 stores therein various types of parameters for use when the drive 27 is driven.

In FIG. 3 example, the drive memory 47 is configured by a Bank0 and a Bank1, and the Bank0 is the firmware area 81, and the Bank1 is the management area 82. In this example, even if any data and program stored either in the firmware area 81 or the management area 82 is rewritten or erased, e.g., when the firmware stored in the firmware area 81 is updated, the drive memory 47 is so configured as not to affect the data and program stored in the remaining area.

The firmware area 81 stores therein firmware for process execution of diagnosis, readjustment, and others. With the diagnosis process, a diagnosis is made to see whether the drive 27 is operating normally during manufacturing or after shipment, and with the readjustment process, parameters for use to drive the driver 27 are adjusted again.

The firmware stored in the firmware area 81 is configured by a unit program for use to execute a unit process being a part of the process of diagnosis, readjustment, and others. That is, the processes of diagnosis and readjustment are each of a combination of a plurality of unit processes. The unit process is of adjusting the position of the optical pickup 42, controlling various types of servos, and adjusting again the offset value, gain, and others of an amplifier, for example. The firmware area 81 stores therein unit programs for execution of each of such unit processes.

The management area 82 stores therein a definition table, a process step table, and others. The definition table indicates the locations of various types of parameters for use when the drive 27 is driven, and unit programs of executing any corresponding unit process. The process step table indicates the unit processes configuring the process of diagnosis or readjustment, and the execution sequence of the unit processes, i.e., the sequence of executing the unit programs, for example.

Herein, the various parameters for storage in the management area 82 are those used for a process related to data reading by the drive 27 from the disk 29, or a process related to data recording by the drive 27 to the disk 29. Specifically, the parameters are exemplified by servo control values, servo adjustment values, write strategies, and others, and for every type of the disk 29, a fixed value is stored for the servo control value, the servo adjustment value, and the write strategy. The servo control value indicates the rotation frequency, the rotation speed, and others for rotating the disk 29 at the time of tracking servo control or focus servo control. The servo adjustment value indicates an offset value or others of a drive signal when the optical pickup 42 emits laser lights.

More in detail, the firmware for storage in the drive memory 47 is configured by a unit program for execution of the unit processes, and a process step table in which the execution sequence is defined for the unit programs.

The definition table stored in the management area 82 is provided for every type of the unit processes as shown in FIG. 4, for example. The definition tables each include an execution function implemented by any corresponding unit program being executed, i.e., a unit process for execution, a physical address indicating the storage location of the unit program, and an operation number unique to the unit process.

In FIG. 4 example, exemplified as the definition tables are an adjustment table, a measurement table, a servo operation table, and a retry operation table. The adjustment table includes information about various types of adjustment processes each being a unit process for position adjustment of the optical pickup 42, for example. The measurement table includes information about a measurement process being a unit process such as jitter measurement of a reproduction signal. The servo operation table includes information about a process of controlling various types of servo operations each being a unit process such as tracking servo and focus servo. The retry operation table includes information about a retry process for resetting the execution sequence to the original state, i.e., currently-executed unit process, when any error occurs during the execution of a unit process.

The adjustment table includes information about a unit process of "adjustment 1", indicating that a unit program is stored at a physical address, i.e., a physical address of the firmware area 81, of "0x00000", and the operation number defined again for the physical address is "1" to allow reference and execution, in firmware, of a unit process to be executed by the unit program.

The adjustment table also includes information about a unit process of "adjustment 2" under the operation number "2" indicating that a unit program is stored at a physical address of "0x00004", and information about a unit process of "adjustment 3" under the operation number "3" indicating that a unit program is stored at a physical address of "0x00008".

The measurement table being a definition table includes information about a unit process of "measurement 1" under the operation number "4" indicating that a unit program is stored at a physical address of "0x000C", information about a unit process of "measurement 2" under the operation number "5" indicating a unit program is stored at a physical address of "0x0010", and information about a unit process of "measurement 3" under the operation number "6" indicating that a unit program is stored at a physical address of "0x0014".

Similarly, the servo operation table being a definition table includes information about a unit process of "servo operation 1" under the operation number "7" indicating that a unit program is stored at a physical address of "0x0018", information about a unit process of "servo operation 2" under the operation number "8" indicating that a unit program is stored at a physical address of "0x001C", and information about a unit process of "servo operation 3" under the operation number "9" indicating that a unit program is stored at a physical address of "0x0020".

The retry operation table being a definition table includes information about a unit process of "retry operation 1" under the operation number "10" indicating that a unit program is stored at a physical address of "0x0024", information about a unit process of "retry operation 2" under the operation number "11" indicating that a unit program is stored at a physical address of "0x0028", and information about a unit process of "retry operation 3" under the operation number "12" indicating that a unit program is stored at a physical address of "0x002C".

As such, the management area 82 carries therein the definition tables, and the disk recording/reproduction device 1 combines some of the unit processes defined by the definition tables, and executes the set of the unit processes in order so that the process of diagnosis or readjustment is executed to maintain the recording/reproduction capability of its own. Alternatively, the definition tables may include a table for a process of, through comparison between a value being the measurement result and a predetermined threshold value, making a diagnosis to see whether the measurement value is appropriate or not, a process of calculating any predetermined parameter value using the measurement value, and others.

When the management area 82 includes the definition tables of FIG. 4, the management area 82 includes process step tables of FIG. 5, for example.

The process step tables of FIG. 5 include information about a unit process configuring the processes of diagnosis, readjustment, and others, the process step numbers indicating the execution sequence of the unit processes, the operation numbers for specifying the unit processes, and the retry number indicating the operation number of a retry process, which is executed when any error occurs during the execution of the unit processes.

In FIG. 5 example, the process step table on the left side includes information about a unit process of "servo operation 1" indicating that the process step number is "1", the operation number is "7", and the retry number is "12", information about a unit process of "adjustment 1" indicating that the process step number is "2", the operation number is "1", and the retry number is "11", and information about a unit process of "servo operation 2" indicating that the process step number is "3", the operation number is "8", and the retry number is "12".

The process step table on the left side includes information about a unit process of "adjustment 2" indicating that the process step number is "4", the operation number is "2", and the retry number is "11", information about a unit process of "measurement 1" indicating that the process step number is "5", the operation number is "4", and the retry number is "10", information about a unit process of "servo operation 3" indicating that the process step number is "6", the operation number is "9", and the retry number is "12", and information about a unit process of "NULL" indicating that the process step number is "7", the operation number is "n", and the retry number is "n".

Herein, the unit process of "NULL" denotes that every unit process found in the process step table has been executed, i.e., denotes the end of the process, and the operation number "n" takes an arbitrary number. The retry number "n" denotes that no retry process is to be executed. The operation numbers and the execution functions in the process step table are those corresponding to the operation numbers and the execution functions found in the definition tables of FIG. 4.

With the process of diagnosis or readjustment in the process step table on the left side of FIG. 5, the disk recording/reproduction device 1 executes, in order, the unit processes under the process step numbers of "1" to "6" in the process step table, i.e., from the unit process of "servo operation 1" under the process step number "1" to the unit process of "servo operation 3" under the process step number "6".

In this case, when any error occurs during the execution of the unit process of "servo operation 1" under the process number of "1", for example, the disk recording/reproduction device 1 executes a retry process to return to its original state, i.e., a process unit of "retry operation 3" under the retry number of "12". That is, because the retry process for any error occurred during the execution of the unit process of "servo operation 1" is under the retry number of "12", the disk recording/reproduction device 1 refers to the definition tables of FIG. 4, and executes the unit process of "retry operation 3" under the retry number, i.e., operation number, of "12".

While the drive 27 is being driven, it is highly likely that the servo operation or others become unstable due to the performance limit of the components configuring the drive 27, thereby the servos and the components of the drive 27 may not be correctly driven and adjusted. In consideration thereof, as shown in FIG. 5, the process step tables are each previously provided with a retry process of resetting the execution sequence to the unit processes to be executed.

As such, the process step table includes, to be ready for a case if some error occurs during the execution of a unit program for use to execute a retry process corresponding to each of the unit processes, i.e., a unit process, information indicating the unit program of executing the retry process to reset the execution sequence to the error-occurred unit program.

Similarly, in FIG. 5, the process step table on the right side includes information about a unit process of "servo operation 2" indicating that the process step number is "1", the operation number is "8", and the retry number is "12", information about a unit process of "measurement 3" indicating that the process step number is "2", the operation number is "6", and the retry number is "10", and information about a unit process of "servo operation 1" indicating that the process step number is "3", the operation number is "7", and the retry number is "12".

The process step table on the right side also includes information about a unit process of "measurement 2" indicating that the process step number is "4", the operation number is "5", and the retry number is "10", information about a unit process of "servo operation 3" indicating that the process step number is "5", the operation number is "9", and the retry number is "12", information about a unit process of "measurement 3" indicating that the process step number is "6", the operation number is "6", and the retry number is "10", and information about a unit process of "NULL, indicating that the process step number is "7", the operation number is "n", and the retry number is "n".

As such, the management area 82 includes the process step tables, and the processes of diagnosis and readjustment found in the process step tables are each of a combination of a plurality of unit processes. For example, the unit process of "servo operation 1" under the process step number of "1" configuring the process found in the process step table on the left side of FIG. 5 is the same as the unit process of "servo operation 1" under the process step number of "3" found in the process step table on the right side. The unit program for execution of the unit process is stored at the physical address of "0x0018" in the firmware area 81 as shown in FIG. 4.

As such, the program for execution of the unit process of "servo operation 1" has been redundantly stored as is included in the firmware for each of the processes in the different process step tables. In the disk recording/reproduction device 1, however, the firmware area 81 stores a unit program for execution of a unit process being a part of a process found in a plurality of process step tables. This thus favorably enables to execute a larger number of processes of diagnosis and readjustment to maintain the recording/reproduction capability of the disk recording/reproduction device 1 even if the drive memory 47 is small in storage capacity.

More specifically, for a process of diagnosis of diagnosing whether the focus bias of the optical pickup 42 is appropriate in value, i.e., as a process found in a process step table, the disk recording/reproduction device 1 refers to the process step table of FIG. 6A to execute a process of diagnosis for focus bias. Note here that the process step tables of FIGS. 6A and 6B show no operation number.

The process step table of FIG. 6A includes information about a unit process of "seek operation" indicating that the process step number is "1" and the retry number is "10", information about a unit process of "recording" indicating that the process step number is "2" and the retry number is "11", information about a unit process of "seek operation" indicating that the process step number is "3" and the retry number is "10", information about a unit process of "jitter measurement" indicating that the process step number is "4" and the retry number is "10", information about a unit process of "diagnosis" indicating that the process step number is "5" and the retry number is "12", and information about a unit process of "NULL" indicating that the process step number is "6" and the retry number is "n".

When reading the process step table of FIG. 6A from the management area 82, the firmware control section 46 of the disk recording/reproduction device 1 exercises control over the servo control section 45 so that a unit process of "seek operation" under the process step number "1" is executed. Based on the value of the focus bias that has been set, the optical pickup 42 is then moved to the area for trial writing of the disk 29. Herein, the focus bias denotes the level of an offset signal to be overlaid on a focus servo signal, i.e., servo signal, generated from a focus error signal representing displacement between the data recording surface of the disk 29 and the focus position of a laser light irradiated by the optical pickup 42 to the data recording surface of the disk 29.

The firmware control section 46 then exercises control over the recording processing section 52 so that a unit process of "recording" under the process step number of "2" is executed. The optical pickup 42 is then made to emit laser lights so that predetermined data is written to any specified address in the area provided for trial writing of the disk 29. The firmware control section 46 also exercises control over the servo control section 45 so that a unit process of "seek operation" under the process step number of "3" is executed. Based on the value of the focus bias that has been set, the optical pickup 42 is then moved to the position at a head address recorded with the data of trial writing of the disk 29.

The firmware control section 46 then exercises control over the servo control section 45 and the reproduction processing section 44 so that a unit process of "jitter measurement" under the process step number of "4" is executed. The optical pickup 42 is then made to emit laser lights so that data of trial writing of the disk 29 is reproduced to make the reproduction processing section 44 to perform jitter measurement with respect to the reproduction signal. The firmware control section 46 also then executes a unit process of "diagnosis" under the process step number of "5" so that a determination is made whether the jitter value being the measurement result of the reproduction processing section 44 is equal to or larger than a predetermined threshold value. In this manner, a determination is made whether the value of the focus bias is appropriate or not.

Herein, the jitter of the reproduction signal is the phase difference from the zero cross point of a reproduction signal when a mark recorded on the disk 29 is reproduced, and is caused due to the waveform interference dependent on the mark interval and the reproduction spot diameter, the aberration of a reproduction optical system, a signal noise, and others. Such jitter is generally used as an index indicating the reproduction capability of the disk recording/reproduction device.

The retry processes indicated by the retry numbers "10" and "11" in the process step table of FIG. 6A include a process for a seek operation again, a process for recording of trial writing data again, and others. The retry process indicated by the retry number "12" is a process of resetting the execution sequence to the process under the process step number of "1".

In this case, when a determination is made in the unit process of "diagnosis" under the process step number of "5" that the value of the focus bias is not appropriate, this means that some error has occurred so that, with the retry process indicated by the retry number of "12", the procedure returns to the process under the process step number "1", and the jitter measurement is performed again.

As another example, as a process found in the process step table, with a focus bias readjustment process to derive an appropriate value for the focus bias of the optical pickup 42, the disk recording/reproduction device 1 refers to the process step table of FIG. 6B so that the focus bias readjustment process is executed.

The process step table of FIG. 6B includes information about a unit process of "seek operation" indicating that the process step number is "1" and the retry number is "10", information about a unit process of "focus bias setting" indicating that the process step number is "2" and the retry number is "n", information about a unit process of "jitter measurement" indicating that the process step number is "3" and the retry number is "11", information about a unit process of "focus bias setting" indicating that the process step number is "4" and the retry number is "n", and information about a unit process of "jitter measurement" indicating that the process step number is "5" and the retry number is "11".

The process step table of FIG. 6B also includes information about a unit process of "focus bias setting" indicating that the process step number is "6" and the retry number is "n", information about a unit process of "jitter measurement" indicating that the process step number is "7" and the retry number is "11", information about a unit process of "focus bias setting" indicating that the process step number is "8" and the retry number is "n", information about a unit process of "jitter measurement" indicating that the process step number is "9" and the retry number is "11", information about a unit process of "adjustment value derivation", indicating that the process step number is "10" and the retry number is "n", and information about a unit process of "NULL" indicating that the process step number is "11" and the retry number is "n".

After reading the process step table of FIG. 6B from the management area 82, the firmware control section 46 of the disk recording/reproduction device 1 exercises, first of all, control over the servo control section 45 so that a unit process of "seek operation" under the process step number of "1" is executed, and moves the optical pickup 42 to the position at any specified address of the disk 29.

The firmware control section 46 then exercises control over the servo control section 45 so that a unit process of "focus bias setting" under the process step number of "2" is executed. In this manner, the focus bias is set to a predetermined value. The firmware control section 46 also exercises control over the servo control section 45 and the reproduction processing section 44 so that a unit process of "jitter measurement" under the process step number "3" is executed. In this manner, jitter measurement is performed with respect to the value of the focus bias that has been set.

The firmware control section 46 also exercises control over the servo control section 45 so that a unit process of "focus bias setting" under the process step number of "4" is executed, and the value of the focus bias is changed. A unit process of "jitter measurement" under the process step number "5" is also executed thereby so that jitter measurement is performed. Thereafter, the unit processes under the process step numbers "6" to "9" are executed thereby in order so that jitter measurement is performed with respect to the value of the focus bias that has been changed little by little.

The firmware control section 46 executes a unit process of "adjustment value derivation" under the process step number of "10" so that an optimum value is derived for the focus bias based on the jitter from the reproduction processing section 44. In this manner, the value of the focus bias being the servo adjustment value stored in the management area 82 of the drive memory 47 is changed to the found optimum value.

This thus enables to readjust the value of the focus bias to be optimum even with a change of a tolerance curve from a curve Z11 to a curve 12 due to aging of the components of the optical pickup 42 after shipment, i.e., the tolerance curve is of jitter with respect to the value of the focus bias measured in plant before shipment of the disk recording/reproduction device 1.

Figure 7:
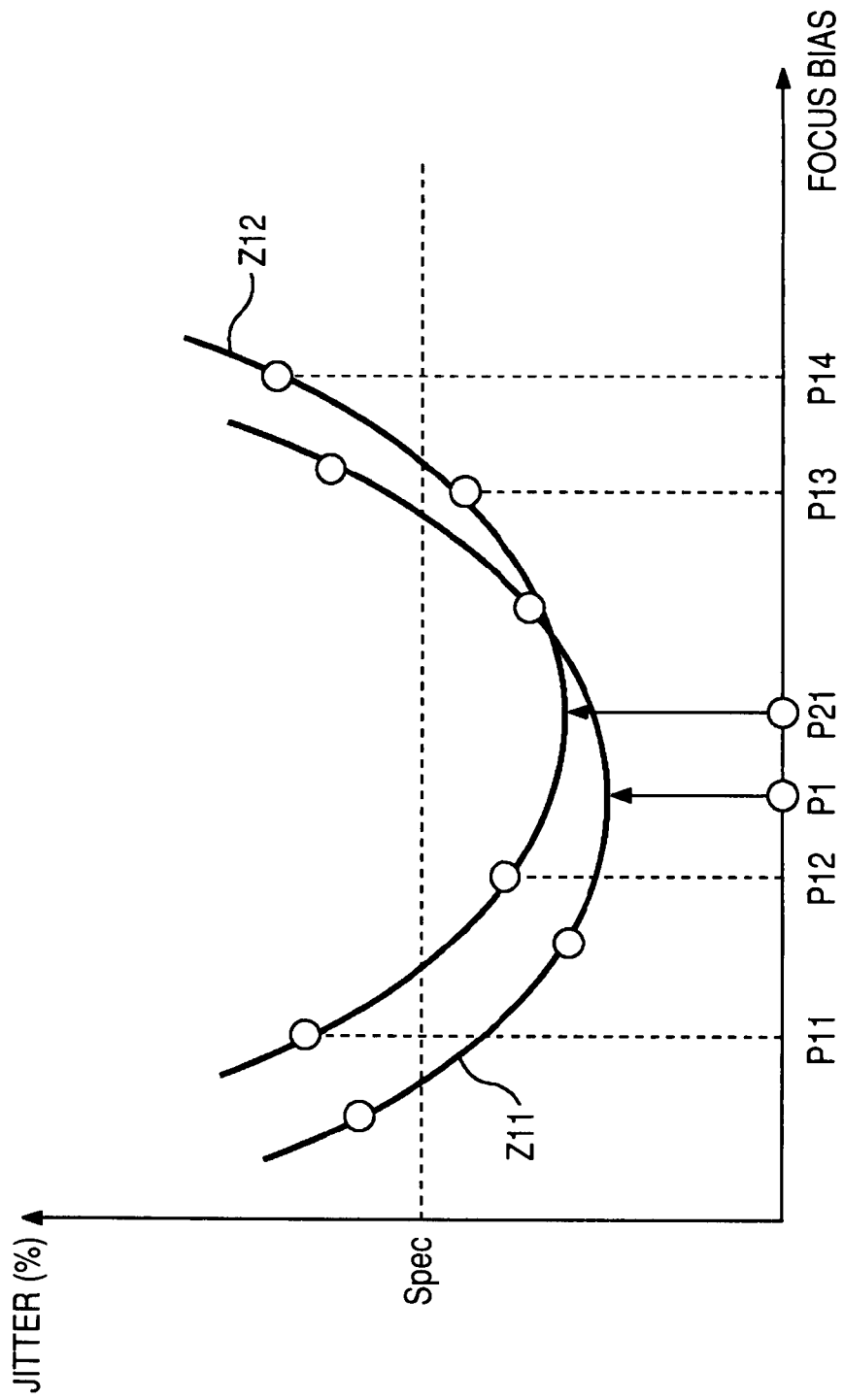
FIG. 7 is a diagram for illustrating jitter with respect to focus bias.

As shown in FIG. 7, the vertical axis indicates jitter, and the horizontal axis indicates a value of focus bias. The jitter value Spec indicates the maximum value in a possible value range for the focus bias serving as a servo adjustment value.

As shown in FIG. 7, when the tolerance curve before shipment of the disk recording/reproduction device 1 is the curve Z11, the value of the focus bias being a servo adjustment value is a value P1 with which the jitter value is minimized for the curve Z11.

The optimum value of the focus bias changes due to aging of the components of the optical pickup 42, and the change varies from one optical pickup 42 to another. Thus, in order to maintain the recording/reproduction capability of the disk recording/reproduction device 1, the value of the focus bias being a servo adjustment value has to be adjusted again.

In consideration thereof, assumed here is that the disk recording/reproduction device 1 executes a readjustment process found in the process step table of FIG. 6B, and performs jitter measurement with respect to every focus bias with the values of the focus bias of P11 to P14, thereby deriving the tolerance curve of Z12. In this case, because the value of the focus bias minimizing the jitter of the tolerance curve is P21, the disk recording/reproduction device 1 thus changes the value of the focus bias, i.e., servo adjustment value, from P1 to the currently-optimum value P21.

When a user issues a command of executing a process of diagnosis or readjustment through operation of the disk recording/reproduction device 1, the system control section 12 generates a command of executing the process directed by the user in response to an operation signal provided by the user I/F 11 in accordance with the user operation. The resulting command is forwarded to the drive 27 via the components, i.e., the bus 15, the data control section 24, and the drive control section 26.

At this time, when a user issues a command of updating of a process step table to a process step to update any predetermined process step table, for example, the communications section 14 is provided with a supply of a process step table from any external device (not shown) connected to the disk recording/reproduction device 1. The system control section 12 acquires the process step table from the communications section 14, and forwards the acquired process step table and the command of updating the process step table to the drive 27.

Upon reception of the command of directing the execution of a process of diagnosis or readjustment from the system control section 12, in accordance with the command, the drive 27 starts a process of reading a process step table of the process directed for execution, i.e., process step table reading process.

Figure 8:
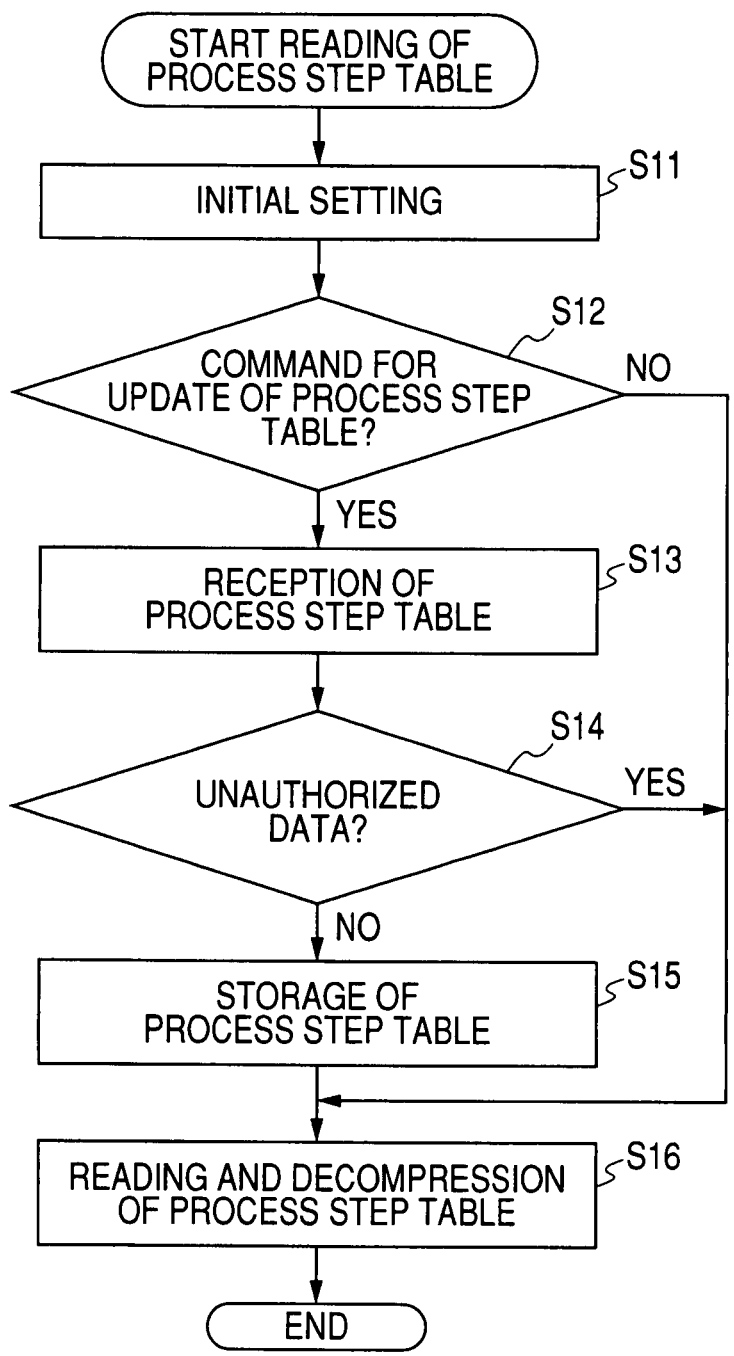
FIG. 8 is a flowchart for illustrating a process of reading a process step table.

In the below, by referring to the flowchart of FIG. 8, described is the process step table reading process by the drive 27.

In step S11, the firmware control section 46 goes through an initial setting process, e.g., the firmware control section 46 performs memory check or others for the drive memory 47 as an initial setting.

The host I/F 49 receives a command from the system control section 12, and forwards the received command to the information memory 50 for storage therein. When receiving a process step table together with a command of updating a process step table from the system control section 12, the host I/F 49 receives the command, and supplies the command to the information memory 50 for storage therein. The command temporarily stored in the information memory 50 is read by the host I/F 49 for supply to the firmware control section 46.

In step S12, the firmware control section 46 determines whether or not a command is directed to update the process step table. When receiving the command of updating the process step table from the host I/F 49, the firmware control section 46 determines that the table updating is directed.

When it is determined in step S12 that no command is directed to update the process step table, the processes of steps S13 to S15 are skipped so that the procedure goes to step S16.

On the other hand, when it is determined in step S12 that a command is directed to update the process step table, in step S13, the host I/F 49 receives the process step table coming from the system control section 12, and supplies the received process step table to the information memory 50 for storage therein.

In step S14, the firmware control section 46 determines whether the process step table stored in the information memory 50 is unauthorized data or not. As an example, because the process step table includes an ID for identification use thereof, the firmware control section 46 performs ID comparison, i.e., the ID found in the process step table stored in the information memory 50 is compared with the ID found in the process step table stored in the management area 82 of the drive memory 47. When there is an ID matching, it is determined that the table is the authorized data.

When the table is determined as being unauthorized data in step S14, it means that the received process step table is unauthorized, and thus the process step table is not updated so that the procedure goes to step S16.

On the other hand, when the table is determined as not being unauthorized data in step S14, the procedure goes to step S15. In step S15, the firmware control section 46 acquires the process step table directed for updating from the information memory 50 via the host I/F 49, and forwards the table to the drive memory 47 for storage therein. The drive memory 47 overwrites the process step table provided by the firmware control section 46 with the process step table in the management area 82 directed for updating so that the process table is updated.

In the following case, i.e., when the process table is updated in step S15, when it is determined that the table is the unauthorized data in step S14, or when it is determined that the process step table is not directed to be updated in step S12, in step S16, the firmware control section 46 reads the process step table of the process directed for execution from the management area 82 of the drive memory 47. This recording is made based on the command from the host I/F 49. The process step table is then decompressed on the information memory 50, and this is the end of the process step table reading.

When a command comes from the system control section 12 for execution of a process of diagnosis or readjustment, the drive 27 reads the process step table of the process directed for execution from the management area 82 of the drive memory 47, and decompresses the table on the information memory 50. When a command comes to direct updating of the process step table, the drive 27 stores the process step table provided by the system control section 12 into the drive memory 47 so that the process step table is updated.

As such, in this embodiment, the firmware is configured by unit programs, and a process step table defining the execution sequence of the unit programs. This enables updating of the firmware only by updating the process step table, and eliminates the need for storage of any new program every time the firmware is updated. The unit programs are stored in the disk recording/reproduction device 1 in advance, and only the process step tables are exchanged with any external device so that the disk recording/reproduction device 1 can be protected in terms of confidentiality.

With the disk recording/reproduction device of previous type, for updating firmware, on the end of providing the firmware, there needs to perform reliability evaluation of the firmware before distribution.

On the other hand, in this embodiment, even if any process to be executed to maintain the recording/reproduction capability is changed or corrected, only by additionally executing a unit program that has been evaluated for its reliability before shipment or for use after shipment, i.e., combining a highly-reliable unit program previously stored in the disk recording/reproduction device 1, the process execution is enabled for maintaining the recording/reproduction capability after updating. Accordingly, the operation diagnosis and parameter readjustment can be performed with high accuracy. Also on the end of providing the firmware, there only needs to evaluate the process step table so that the number of steps of evaluating the reliability of the firmware can be favorably reduced.

Described above is the case of updating a process step table. Also in a case where a process step table is added for any new process of diagnosis or readjustment, for example, the process step table to be added is supplied to the system control section 12 from any external device via the communications section 14. The process step table is then forwarded to the information memory 50 for storage therein from the system control section 12 via the host I/F 49 of the drive 27. The firmware control section 46 then acquires any new process step table stored in the information memory 50 for storage in the management area 82 of the drive memory 47.

In such a case with the new process step table, when the drive memory 47 carries therein no unit program of executing a unit process found in the process step table, the system control section 12 provides the drive 27 with a new unit program together with the process step table. Also in this case, the firmware control section 46 acquires the new unit program stored in the information memory 50 for storage into the firmware area 81 of the drive memory 47. The firmware area 81 of the drive memory 47 does not redundantly store therein the same unit program. Therefore, even if a plurality of process step tables include the same unit process, i.e., the same unit program, the number of the unit programs to be stored is one, thereby preventing the storage capacity from being unnecessarily used.

As such, when the process step table of the process directed for execution by the system control section 12 is decompressed on the information memory 50, by referring to the process step table, the drive 27 starts the execution process, i.e., process of executing the directed process. In the below, by referring to the flowchart of FIG. 9, described is this execution process by the drive 27.

In step S41, the firmware control section 46 reads the process step table stored in the information memory 50. The firmware control section 46 stores 0 to a process step number counter indicating the process step number of a unit process before execution, and stores 0 to a retry frequency counter indicating the frequency of a retry process.

In step S42, the firmware control section 46 increments only by 1 the process step number counter in storage. When the process step number counter is 0 in storage, the firmware control section 46 increments the process step number counter by 1.

In step S43, the firmware control section 46 reads, from the firmware area 81 of the drive memory 47, a unit program for execution of the unit process under the process step number indicated by the process step number counter in storage.

When the firmware control section 46 reads a process step table on the left side of FIG. 5, and when the process step number counter in storage indicates 1, for example, by referring to the definition tables stored in the management area 82 of the drive memory 47, the firmware control section 46 reads a unit program stored at a physical address "0x0018" of the firmware area 81, i.e., a unit program for execution of a unit process of "servo operation 1" under the operation number of "7".

In step S44, the firmware control section 46 executes the unit program read as such, thereby exercising control over the components of the drive 27 to control execution of the unit process. When the firmware control section 46 reads the process step table on the left side of FIG. 5, and when the process step number counter in storage indicates "1", for example, the firmware control section 46 exercises control over the execution of the unit process under the process step number "1", i.e., the unit process of "servo operation 1" under the operation number of "7".

More specifically, the firmware control section 46 exercises control over the servo control section 45, and the servo control section 45 drives, based on a servo signal from the reproduction processing section 44, the spindle motor 41 and the motor of the thread 43 so that the focusing and tracking of the optical pickup 42 are controlled. Herein, when the unit process under the process step number indicated by the process step number counter is "NULL", the firmware control section 46 executes no unit process.

In step S45, the firmware control section 46 determines whether any error occurs during the execution of the unit process. In the following case, i.e., when the servo operation executed as a unit process is not completed correctly, or when a measurement value is determined as not being appropriate in the process of diagnosis being a unit process, the firmware control section 46 determines that some error has occurred.

In step S45, when it is determined that no error is occurred, the procedure goes to step S46, and the firmware control section 46 determines whether the unit processes under every process step number are executed through comparison between the read process step table and the process step number counter in storage.

When the process step table on the left side of FIG. 5 is read, and when the process step number counter in storage indicates "7", for example, the firmware control section 46 determines that the unit processes under every process step number are executed.

In step S46, when it is determined that the unit processes under every process step number are executed, it means that the process directed by the command from the system control section 12 is completed so that the execution process is ended.

On the other hand, in step S46, when it is determined that the unit processes under every process step number are not yet completed, the procedure returns to step S42. In step S42, the process step number counter is incremented only by 1, and the unit process under the next process step number is executed. That is, by referring to the process step table, the firmware control section 46 sequentially reads and executes a unit program for execution of the unit processes found in the process step table, thereby exercising control over the execution of the process of diagnosis or readjustment directed for execution.

In step S45, when it is determined that some error has occurred, the procedure goes to step S47, and the firmware control section 46 determines whether a retry process is required or not. When some error occurs during the execution of the unit process under the process number "1" in the process step table on the left side of FIG. 5, because the process step table is including a retry number "12" indicating a retry process, the firmware control section 46 determines that the retry process is required to be executed.

When some error is occurred during the execution of the unit process under the process number "2" in the process step table of FIG. 6B, because a retry number indicating the retry process for the unit process is "n", the firmware control section 46 determines that no retry process is required to be executed.

In step S47, when it is determined that no retry process is required, the retry process is accordingly not executed. Therefore, the processes of steps S48 and S49 are skipped, and the procedure goes to step S50.

On the other hand, in step S47, when it is determined that the retry process is required, in step S48, the firmware control section 46 reads, from the firmware area 81 of the drive memory 47, a unit program for execution of a retry process indicated by a retry number.

In step S49, the firmware control section 46 exercises control over the components of the drive 27 by executing the unit program read as such, thereby exercising control over the execution of the retry process. When the firmware control section 46 reads the process step table on the left side of FIG. 5, and when some error occurs during the unit process under the process step number of "1", for example, the firmware control section 46 exercises control over the execution of the retry process indicated by the retry number "12", i.e., the unit process of "retry operation 3" under the operation number of FIG. 4 is "12".

That is, by referring to the definition tables stored in the management area 82 of the drive memory 47, the firmware control section 46 reads a unit program stored at a physical address "0x002C" of the firmware area 81. By executing the unit program read as such, the firmware control section 46 exercises control over the components of the drive 27 so that a retry process is executed.

When a retry process is executed in step S49, or when a determination is made that no retry process is required in step S47, in step S50, the firmware control section 46 increments the retry frequency counter in storage only by 1.

Note here that the number indicated by the retry frequency counter denotes the frequency of a retry process when a process in the process step table, e.g., a process of diagnosis or readjustment, is executed. Alternatively, the number may indicate the frequency of a retry process executed when one unit process is executed.

In step S51, the firmware control section 46 determines whether the number indicated by the retry frequency counter is equal to or larger than a predetermined number. When it is determined in step S51 that the retry frequency is lower than the predetermined number, it means that the execution sequence is to be returned to the original unit process so far completed so that the procedure returns to step S43 for the subsequent processes as described above.

On the other hand, in step S51, when it is determined that the retry frequency is equal to or larger than the predetermined number, the execution sequence does not return to the unit process, and the execution process is thus ended. At this time, the firmware control section 46 generates a signal indicating that some error has occurred, and the generated signal is then forwarded to the system control section 12 via the components, i.e., the host I/F 49, the drive control section 26, the data control section 24, and the bus 15. Upon reception of the signal from the firmware control section 46 indicating that some error has occurred, the system control section 12 supplies an image notifying the error occurrence to the display 20 via the video audio I/F 16 if required, and the image is then displayed.

Note that, considered here is a case where there is no need to execute a retry process to any error-occurred unit process, and where the unit process(es) under the subsequent process step numbers is (are) executed even if the drive 27 does not execute the unit process. In such a case, instead of the procedure going from step S45 to S47 when some error occurs during the execution of the unit process, the procedure may return from step S45 to S42 to execute the unit process(es) under the subsequent process step number(s).

As such, in accordance with a process step table, the drive 27 reads unit programs, and while referring to the process step table read as such, sequentially executes unit processes configuring a process of diagnosis or readjustment whatever directed.

By reading a unit program in accordance with a process step table, and by sequentially executing unit processes configuring a process of diagnosis or readjustment whatever directed, using a highly-reliable unit program stored in advance in the disk recording/reproduction device 1, a larger number of processes of diagnosis or readjustment can be executed to maintain the recording/reproduction capability of the disk recording/reproduction device 1. As such, it is thus favorably possible to prevent any possible deterioration of the recording/reproduction capability with more ease and reliability at lower cost.

Specifically, because a process of diagnosis or readjustment is a combination of a plurality of unit processes, any unit program needed for execution of a larger number of processes of diagnosis or readjustment can be stored with less resources. Accordingly, parameters that have been adjusted only before shipment can be adjusted again also after shipment so that the parameters can be controlled to take their optimum values.

Note that, in the above, described is a process of diagnosis and readjustment as an exemplary process being a combination of a plurality of unit processes. This is surely not restrictive, and possible options include a process of adjusting the color of a display screen, a process of adjusting the pixel color of a captured image, and the like. Moreover, exemplified above is a disk recording/reproduction device of executing processes related to data recording and reproduction to/from a disk. This is surely not the only option, and the invention is surely applicable to an information processing device using a disk, and various types of electronic devices for use to control over the operation of the components using a program.

The above-described sequence of processes may be executed by hardware or software. If such processes are to be executed by software, a program configuring the software is installed from a program recording medium to a computer incorporated to any specific hardware, a general-purpose personal computer capable of various types of functions through installation of the programs varying in type, or the like.

Figure 10:
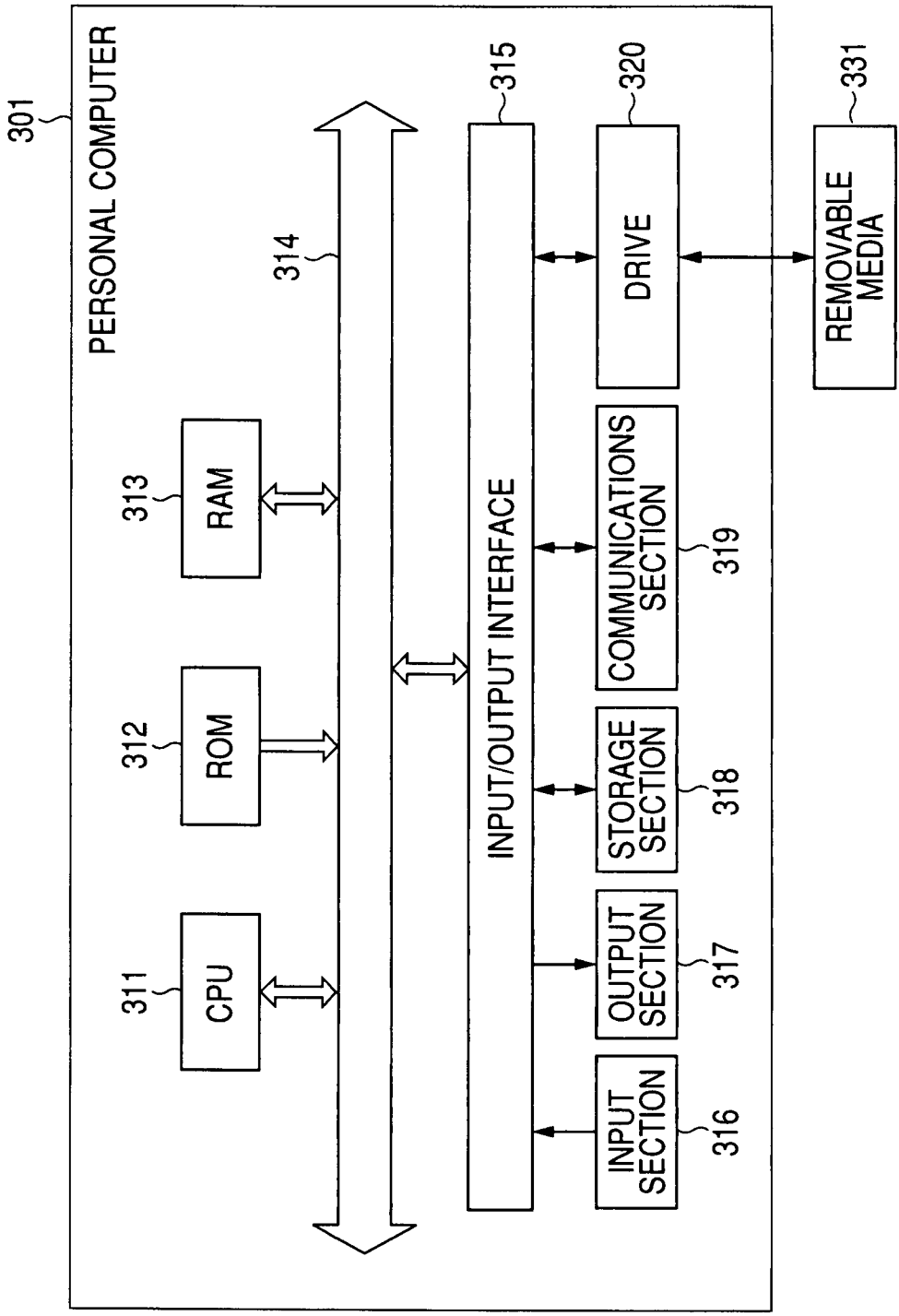
FIG. 10 is a block diagram showing the configuration of a personal computer.

FIG. 10 is a block diagram showing an exemplary configuration of a personal computer in which the sequence of processes described above is executed by a program. In such a personal computer 301, a CPU (Central Processing Unit) 311 executes various types of processes by following a program stored in a ROM 312 or a storage section 318. A RAM 313 stores therein program, data, and others for execution by the CPU 311. These components, i.e., the CPU 311, the ROM 312, and the RAM 313, are connected together over a bus 314.

The CPU 311 is connected with an input/output interface 315 over the bus 314. The input/output interface 315 is connected with an input section 316 and an output section 317. The input section 316 is configured to include a keyboard, a mouse, a microphone, and others, and the output section 317 is configured by a display, a speaker, and others. The CPU 311 executes various types of processes in accordance with a command coming from the input section 316. The CPU 311 then forwards the process result to the output section 317.

The storage section 318 connected to the input/output interface 315 is exemplified by a hard disk, and stores therein programs to be executed by the CPU 311 and various types of data. A communications section 319 communicates with any external device over a network such as the Internet and a local area network.

Alternatively, programs may be acquired over the communications section 319, and stored in the storage section 318.

A drive 320 connected to the input/output interface 315 drives a removable medium 331 when it is attached, and acquires programs and data stored therein. The removable medium 311 is exemplified by a magnetic disk, an optical disk, a magneto-optical disk, or a semiconductor memory. The acquired programs and data are transferred to the storage section 318 as required, and then stored.

A program recording medium for use to store a program to be installed to a computer to be ready to run by the computer is configured by, as shown in FIG. 10, the removable medium 331, the ROM 312, a hard disk configuring the storage section 318, and others. The removable medium 331 is a package medium being a magnetic disk (including flexible disk), an optical disk (including CD-ROM (Compact Disc-Read Only Memory), DVD (Digital Versatile Disc)), and a magneto-optical disc), or a semiconductor memory, for example. The ROM 312 stores therein a program temporarily or permanently. The storage of a program to such a program recording medium is made utilizing a cable or radio communications medium via the communications section 319 if required. The communications medium includes a local area network, the Internet, digital satellite broadcasting, and others, and the communications section 319 is an interface such as rooter or modem.

In this specification, the step description for a program stored in a program recording medium includes not only time-series processes to be executed in the described order but also processes to be executed not necessarily in a time series manner but in a parallel manner or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device that exercises control over a plurality of unit processes, comprising:
    grouping means for grouping the plurality of unit processes to be executed by the electronic device;
    creation means for creating a process step table in which an execution sequence of a plurality of unit programs is defined, for each of the plurality of unit processes;
    storage means for storing the process step table for each of the plurality of unit processes, and storing the plurality of unit programs listed in each of process step tables;
    determining means for determining whether a received command is directed to update the process step table and determining whether the received command updating the process step table is authorized data;
    updating means for updating the process step table stored in the storage means when the received command is determined to be authorized data;
    reading means for reading and decompressing the process step table stored in the storage means and incrementing a process step number counter;
    control means for controlling the plurality of unit programs for the execution of the plurality of unit processes by the electronic device such that the control means is configured to control the execution of various combinations of the plurality of unit processes;
    execution means for executing the plurality of unit programs thereby exercising control over components of the electronic device and to execute control of the plurality of unit processes;
    said execution means for further executing, in the defined execution sequence and when any predetermined one of the plurality of unit processes is directed, the plurality of unit programs defined in any of the process step tables corresponding to the directed plurality of unit processes.

2. The electronic device according to claim 1, wherein the plurality of unit processes include a process of diagnosis of diagnosing whether the execution means is operating normally, or a process of readjustment of readjusting a parameter value for use when the processes are executed.

3. The electronic device according to claim 1, wherein the plurality of unit processes include a process related to data reading from a disk or data recording to the disk.

4. An electronic device according to claim 1, wherein when any error is occurred during the execution of any of the plurality of unit programs that is firstly executed and any of the plurality of unit programs that is secondly executed for resetting the execution sequence to the firstly-executed unit program, and
    when any error is occurred during the execution of the firstly-executed unit program, the execution means executes the secondly-executed unit program by referring to the process step table.

5. A control method of exercising control over plurality of unit processes by an electronic device, comprising the steps of:

grouping the plurality of unit processes to be executed by the electronic device;

creating a process step table in which an execution sequence of a plurality of unit programs is defined;

storing the process step table for each of the plurality of unit processes, and storing the plurality of unit programs listed in each of process step tables;

determining whether a received command is directed to update the process step table and determining whether the received command updating the process step table is authorized data;

updating the process step table stored in the storage means when the received command is determined to be authorized data;

reading and decompressing the process step table stored in the storage means and increments a process step number counter;

controlling the plurality of unit programs for the execution of the plurality of unit processes by the electronic device such that the control means is configured to control the execution of various combinations of the plurality of unit processes;

executing the plurality of unit programs thereby exercising control over components of the electronic device and to execute control of the plurality of unit processes;

further executing, in the defined execution sequence and when any predetermined one of the plurality of unit processes is directed, the plurality of unit programs defined in any of the process step tables corresponding to the directed plurality of unit processes.

6. A computer program product comprising a non-transitory computer readable medium including program code stored thereon for exercising control over processes arbitrary in number for execution by an electronic device, the program code being executable to perform operations comprising:

grouping the plurality of unit processes to be executed by the electronic device;

creating a process step table in which an execution sequence of a plurality of unit programs is defined;

storing the process step table for each of the plurality of unit processes, and storing the plurality of unit programs listed in each of process step tables;

determining whether a received command is directed to update the process step table and determining whether the received command updating the process step table is authorized data;

updating the process step table stored in the storage means when the received command is determined to be authorized data;

reading and decompressing the process step table stored in the storage means and increments a process step number counter;

controlling the plurality of unit programs for the execution of the plurality of unit processes by the electronic device such that the control means is configured to control the execution of various combinations of the plurality of unit processes;

executing the plurality of unit programs thereby exercising control over components of the electronic device and to execute control of the plurality of unit processes;

further executing, in the defined execution sequence and when any predetermined one of the plurality of unit processes is directed, the plurality of unit programs defined in any of the process step tables corresponding to the directed plurality of unit processes.

7. The method according to claim 5, wherein when any error is occurred during the execution of any of the unit programs that is firstly executed and any of the unit programs that is secondly executed for resetting the execution sequence to the firstly-executed unit program, and when any error is occurred during the execution of the firstly-executed unit program, the execution means executes the secondly-executed unit program by referring to the process step table.

8. The electronic device according to claim 1, further comprising:

providing means for providing a definition table for the plurality of unit processes that includes an execution function implemented by any corresponding unit process, a physical address indicating the storage location of the unit program, and an operation number unique to the unit process.

9. The method according to claim 5, further comprising:

providing a definition table for the plurality of unit processes that includes an execution function implemented by any corresponding unit process, a physical address indicating the storage location of the unit program, and an operation number unique to the unit process.

10. The electronic device according to claim 1, wherein the process step table includes:

information about a unit process configuring the processes of diagnosis and readjustment, a process step number indicating the execution sequence of the unit process, a operation number for specifying the unit process, a retry number indicating the operation number of retry process, which is execute when any error occurs during the execution of the 4 unit process.

11. The method according to claim 5, wherein the process step table includes:

information about a unit process configuring the processes of diagnosis and readjustment, a process step number indicating the execution sequence of the unit process, a operation number for specifying the unit process, a retry number indicating the operation number of retry process, which is execute when any error occurs during the execution of the unit process.

* * * * *